United States Patent [19]

Sprenkels et al.

[11] Patent Number: 4,910,840

[45] Date of Patent: Mar. 27, 1990

[54] ELECTROACOUSTIC TRANSDUCER OF THE SO-CALLED "ELECTRET" TYPE, AND A METHOD OF MAKING SUCH A TRANSDUCER

[75] Inventors: Adrianus J. Sprenkels; Piet Bergveld, both of Enschede, Netherlands

[73] Assignee: Microtel, B.V., Amsterdam, Netherlands

[21] Appl. No.: 385,150

[22] Filed: Jul. 26, 1989

Related U.S. Application Data

[62] Division of Ser. No. 263,196, Oct. 27, 1988.

[30] Foreign Application Priority Data

Oct. 30, 1987 [NL] Netherlands ........................ 8702589

[51] Int. Cl.[4] .............................................. H01G 7/00

[52] U.S. Cl. .................................. 29/25.41; 367/170; 367/181; 29/594; 307/400; 381/174; 381/191

[58] Field of Search .................... 29/25.35, 25.41, 594, 29/631.1, DIG. 16; 307/400; 381/191, 174, 113, 116; 367/170, 174, 181

[56] References Cited

U.S. PATENT DOCUMENTS

| | | | |
|---|---|---|---|
| 4,513,348 | 4/1985 | Grantham | 29/25.41 |
| 4,533,794 | 8/1985 | Beveridge | 29/594 |
| 4,558,184 | 12/1985 | Busch-Vishniac et al. | 29/594 |
| 4,586,109 | 4/1986 | Peters et al. | 29/25.41 |
| 4,610,062 | 9/1986 | Roberts et al. | 29/25.41 |
| 4,625,561 | 12/1986 | Mikkor | 29/25.41 |
| 4,675,960 | 6/1987 | Higgins | 29/25.41 |
| 4,691,363 | 9/1987 | Khanna | 381/188 |
| 4,764,690 | 8/1988 | Murphy et al. | 29/594 |
| 4,816,125 | 3/1989 | Muller et al. | 29/594 |

*Primary Examiner*—Deborah L. Kyle
*Assistant Examiner*—J. Woodrow Eldred
*Attorney, Agent, or Firm*—Brady, O'Boyle & Gates

[57] ABSTRACT

This invention provides an electroacoustic transducer and a method of making it. The transducer according to the invention comprises a substrate of a semiconductor material with a recessed portion. A membrane is stretched across the recessed portion, which membrane is set in vibration in response to an input signal comprising audio and/or ultrasonorous frequencies. A pair of electrodes is provided, which form a capacitor, and between which an electric field is present. The electrodes are so arranged relatively to the membrane that the capacitance of the capacitor can vary under the influence of vibrations of the membrane, so that acoustic signals are converted into electric signals. A layer of an electrically insulating material functions as a carrier for an electric charge to provide an auxiliary electric field between the electrodes. The transducer is characterized in that the peripheral edge of the substrate, which is raised relatively to the recessed portion, has a set of openings formed in it, each extending through the substrate. The membrane is attached through the openings to the peripheral edge.

6 Claims, 4 Drawing Sheets

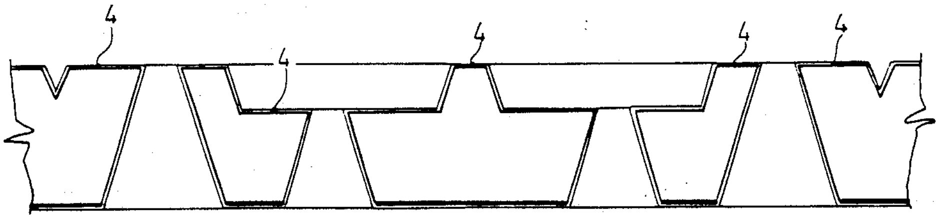
FIG. 8
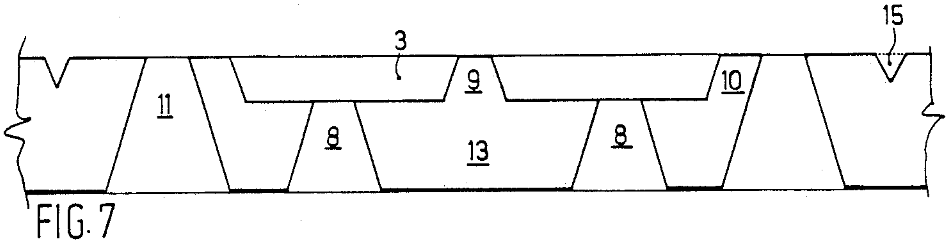
FIG. 7
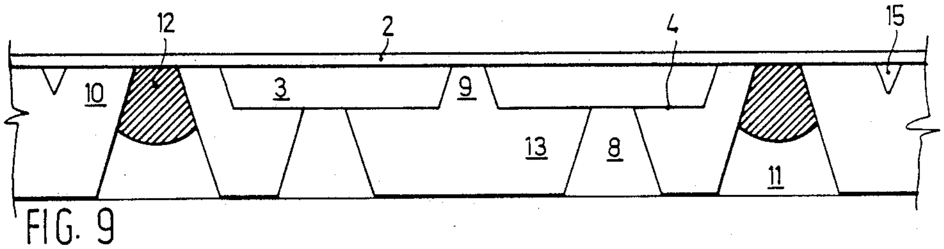
FIG. 9
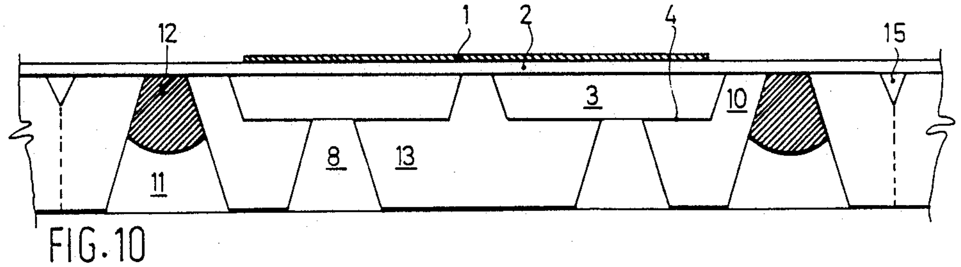
FIG. 10
FIG. 11
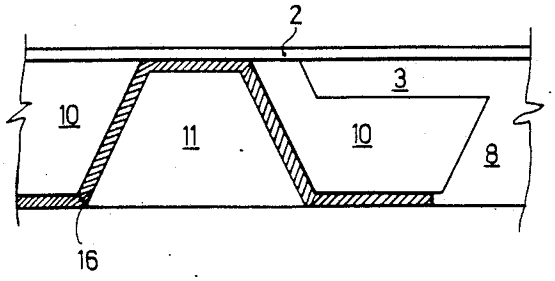

ELECTROACOUSTIC TRANSDUCER OF THE SO-CALLED "ELECTRET" TYPE, AND A METHOD OF MAKING SUCH A TRANSDUCER

This is a division, of application Ser. No. 07/263,196, filed October 27, 1988 pending.

This invention generally relates to an electroacoustic transducer of the so-called "electret" type, and a method of making such a transducer.

More specifically, the invention relates to an electroacoustic transducer comprising a substrate of a semi-conductor material with a recessed portion;

a membrane across said recessed portion, set in vibration in response to an input signal comprising audio and/or ultrasonorous frequencies that is, sound frequencies;

a pair of electrodes forming a capacitor and between which an electric field is present, the electrodes being so arranged relatively to the that the capacitance of the capacitor can vary under the influence of vibrations of the membrane, so that acoustic signals are converted into electric signals; and a layer of an electrically insulating material functioning as a carrier for an electric charge providing an auxiliary electric field between the electrodes.

An electroacoustic transducer of this type is disclosed in Australian Pat. No. 25,822.

In this known electroacoustic transducer, the recessed portion of the substrate is at least partly defined by etching an opening into a layer of $SiO_2$ applied to the Si substrate. The membrane is then secured to the peripheral edge of the recessed portion, which edge consists of $SiO_2$. The manner in which the membrane is secured is not mentioned. In the practice of the process, however, it is the very manner of securing the membrane which leads to major problems, in particular because it is sometimes desired to have a thin, tautly stretched membrane to provide a low sensitivity to accelerations of the transducer, whereas in other cases, the membrane should preferably be entirely free from mechanical stresses to secure a relatively high sensitivity. At the same time, it is desirable that membranes can be secured to a large number of transducers simultaneously, so that they may be mass produced.

It is an object of the present invention to provide for an electroacoustic transducer of the kind described a construction in which the wishes outlined above are met, and a high degree of reproducibility of the ready end product is ensured.

To this effect, an electroacoustic transducer is characterized, according to this invention, in that the peripheral edge of the substrate, which is raised relatively to said recessed portion, has a set of openings formed therein, each extending through the substrate; and the membrane is attached through said openings to said peripheral edge.

According to a further aspect of the invention, the sensitivity of the electroacoustic transducer can be optimized. To this effect, a transducer according to the invention is characterized in that one of the electrodes is secured to the membrane; and the circumferential contour of said electrode falls within the confines of the peripheral edge bounding the recessed portion.

This construction is based upon the idea that the membrane portion in the vicinity of the peripheral edge is virtually not in vibration, and thus does not contribute significantly to the output signal of the transducer.

According to yet another aspect of the invention, this way of securing one of the electrodes to the membrane offers the possibility of solving another problem often experienced in existing electroacoustic transducers. In existing electroacoustic transducers used for making electret microphones, the electroacoustic transducer is housed together with an electronic hybrid amplifier in a metal case. This case and the electrode secured to the membrane are connected to a common potential, such as the earth potential, while the fixed electrode connected to the substrate is connected to the actual signal line. This has the disadvantage that the metal case together with the fixed electrode form a parallel capacitance which adversely affects the signalling behaviour of the transducer.

U.S. Pat. No. 4,730,283 seeks to offer a solution to this problem by minimizing the area through which the case and the fixed electrode can influence each other and hence form a capacitance. This requires a case of relatively complex constructions.

According to the above other aspect of the present invention, in an electroacoustic transducer housed in a metal case together with an electronic hybrid amplifier, the fixed electrode connected to the substrate is connected together with the case with a common potential, and the electrode connected to the membrane is connected to the signal input terminal. As, according to the invention, the electrically conductive area of the membrane, i.e., the area of the electrode, is small, the parallel capacitance has a considerably lower value and, indeed, turns out to be practically negligible in practice, when the electrodes are connected in this manner.

The present invention also relates to a method of making an electroacoustic transducer using a wafer and known per se micromachining and IC technology. It is noted that a similar method of simultaneously making a plurality of transducers from a single silicon wafer is disclosed in U.S. Pat. No. 4,533,795. This known method, however, is intended for making an electroacoustic transducer whose construction exhibits a certain similarity to that described in U.S. Pat. No. 4,524,247. The patent specification last mentioned describes an electroacoustic transducer in which the membrane is a ($p^+$)-doted silicon layer formed from a p-type silicon substrate by an etching process. In that construction the membrane is in fact integral with the substrate, through which at the same time an acoustic coupling between the membrane and the surroundings of the transducer is formed. The electrically insulating layer functioning as a carrier for electric charge is secured to the membrane. More particularly, this electrically insulating layer is disposed on the side of the membrane facing the so-called backplate of the transducer. The conventional air gap between the membrane and the backplate is defined by the thickness of a spacing layer provided between the backplate and the electret layer.

On the ground of considerations of manufacture and economy, such a construction is less attractive. Specifically, this technique has the disadvantage that the application of the layer which is later to form the membrane is one of the first process stages, the result of which is that in subsequent process stages the properties of the membrane may be adversely affected, in particular with regard to the reproducibility of the membrane. Furthermore, in this microphone, again a combination is formed of membrane and electret function, the disadvantages of which are known. This is all the more an objection because this construction does not leave a free choice of the membrane material.

The present invention further aims to provide an alternative to the above prior method, which makes it possible simultaneously to manufacture from a single wafer, using micromachining and IC technology, a plurality of electroacoustic transducers of a construction as defined in claims 1–4, and to comply with the conditions of cost-effective manufacture and degree of reproducibility.

To this effect a method according to the present invention is characterized by the steps of forming a mask on one main face of a wafer of monocrystalline silicon, preferably with an orientation of 100, said mask having a pattern defining the peripheral contour of the recessed portion and the place of any membrane supporting projections thereon of a plurality of transducer units contiguous with one another in rows and columns;

etching the silicon accessible through said mask away over a pre-determined depth, using an etching agent, to form the recessed portion and possibly the membrane supporting projections of the associated transducer units;

forming on the peripheral edges, which are raised relatively to the recessed portions, a mask whose pattern defines the outer circumferential contour of each of the transducer units contiguous with one another in rows and columns, and forming on the other main face of the wafer a mask whose pattern defines all the openings extending through the substrate of the transducer units to be made from the wafer;

etching the silicon accessible through said two masks away by using an etching agent, so that, on the one hand, a mesh-like lattice pattern of V-shaped grooves is recessed in the raised peripheral edges, and on the other, openings extending through the substrate are formed, said openings being covered by masking material on the side where said mesh-like lattice pattern is provided;

removing the masking material;

covering the whole thus obtained with a layer of dielectric, in particular a layer of $SiO_2$, which has a thickness of about 1 $\mu m$ (thickness dimensions of between 0.1 and 3 $\mu m$ are generally suitable);

charging said layer of dielectric uniformly with electric charge;

covering the whole on the side where said mesh-like lattic pattern is provided with a membrane foil;

covering the openings extending through the wafer, except those extending through said edge portions;

filling the exposed openings from the side away from that where the membrane foil is provided with an adhesive so as to secure the membrane foil to the substrate through said adhesive, or evaporating or sputtering a material, such as Cu, on the interior of said openings and on the opposed portions of the membrane foil, so as to secure the membrane foil through said material to the substrate;

providing electrodes for the relevant transducer units on the membrane foil by means of a shadow mask;

cutting the membrane foil according to the mesh-like lattice pattern of V-shaped grooves; and disintegrating the wafer according to said pattern of V-shaped grooves to form a plurality of separate transducer units.

The membrane foil, which serves for all the transducer units to be made from a wafer, can be applied to the wafer, and secured to the relevant elevated edge portions of the transducer units being formed. For this purpose the relevant holes in the wafer are either filled with an adhesive, or internally provided with a thin layer of material, which is also present on the membrane portions covering these openings, from the side away from the side to which the membrane is applied. This can be effected, for example, by evaporating or sputtering metal or a synthetic plastics material from the side referred to in a single pass while the holes present in the wafer which are to serve as acoustic openings are covered by a shadow mask. Alternatively, the membrane can be fastened using a technique in which certain adhesive material is applied by spraying. When the membrane has thus been secured to the wafer, in particular to the relevant elevated edge portions, the top electrodes of the transducer units are provided, for example, by the vapour-deposition of electrode material. Alternatively, the starting product may be a non-conductive membrane foil provided on one or both sides with vapour-deposited conductor material in a pre-determined pattern.

If desired, the silicon accessible through the masks can be etched away anisotropically. In this way it is possible to form openings extending through the substrate with cross-sectional areas gradually decreasing in a direction towards the substrate face to which the membrane is applied.

The method according to the invention makes it possible, instead of teflon, which is frequently used as an electret material, to use a material which is compatible for processing with IC technology, such as $SiO_2$. Silicon dioxide cannot be used as it is for realizing a stable electroacoustic transducer of the so-called electret type. In fact, the auxiliary electric charge applied will disappear in time without more ado.

In order to meet this disadvantage, according to a further aspect of the invention, the method is characterized in that, immediately before the step of charging the applied layer of dielectric with an electric charge, the outer surface of said layer of dielectric is treated so that said surface has hydrophobic properties.

Specifically, the layer of dielectric serving an electret material, such as $SiO_2$, is treated with HMDS (hexamethyl) disilazane), or a substance related thereto.

After such a surface treatment, an electric charge applied to it is retained. In other words, bulk and surface conductivities are so low that, even at high temperature and high relative humidity, a stable electroacoustic transducer can be realized with the electret material being compatible with IC technology. The use of silicon and silicon dioxide makes it possible to integrate further necessary electronics in an electroacoustic transducer according to this invention.

After disintegration of the wafer, so that the individual transducer units have been formed, these may be mounted each separately. This involves fixing in a case; connecting the electrodes to electronics; providing a terminal for the top electrode (the electrode formed on the membrane), using, e.g. a conductive adhesive; forming a terminal for the bottom electrode (the silicon substrate) with conductive adhesive; and possibly contacting the integrated electronics both with the outside world and with the transducer unit.

The invention will be elucidated hereinafter with reference to the accompanying drawings, in which FIG. 1 shows a top plan view of an electroacoustic transducer according to this invention (not to scale) with the membrane foil and top electrode secured thereto being partially removed;

FIGS. 3-11 illustrate in diagrammatic form the various phases of a method in which, starting from a wafer, a plurality of electroacoustic transducer units with a construction of the configuration as shown in FIGS. 1 and 2 can be made.

Figure 1:
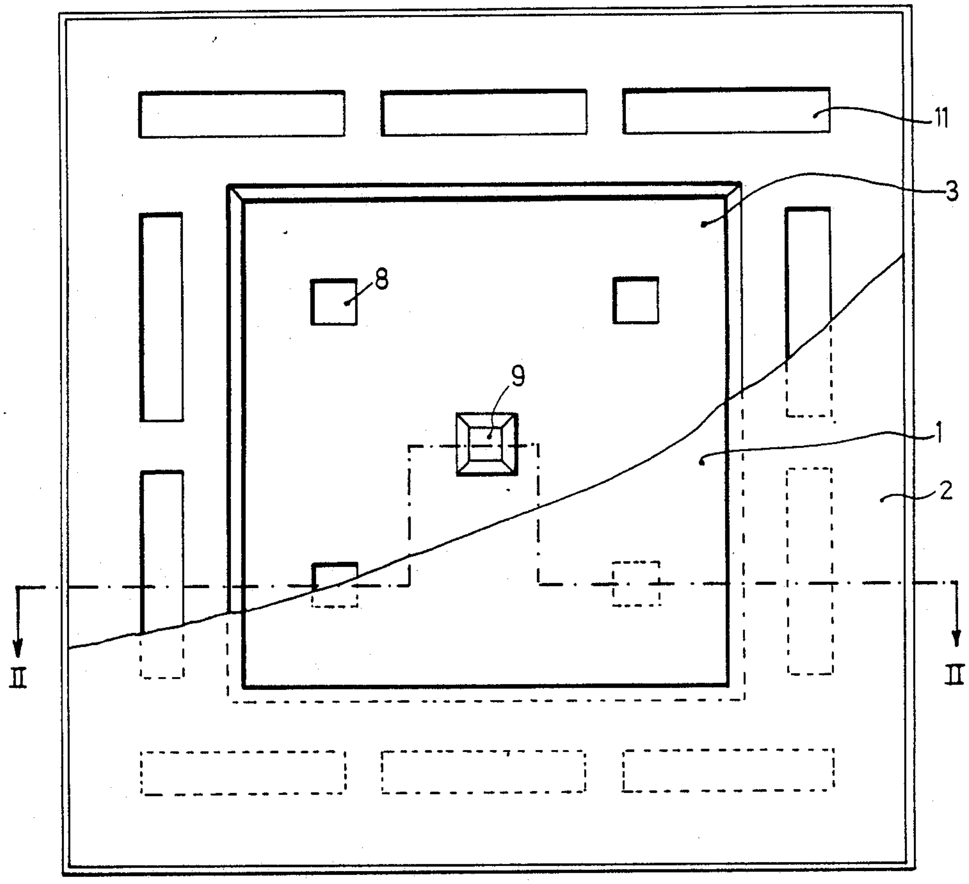
Figure 2:
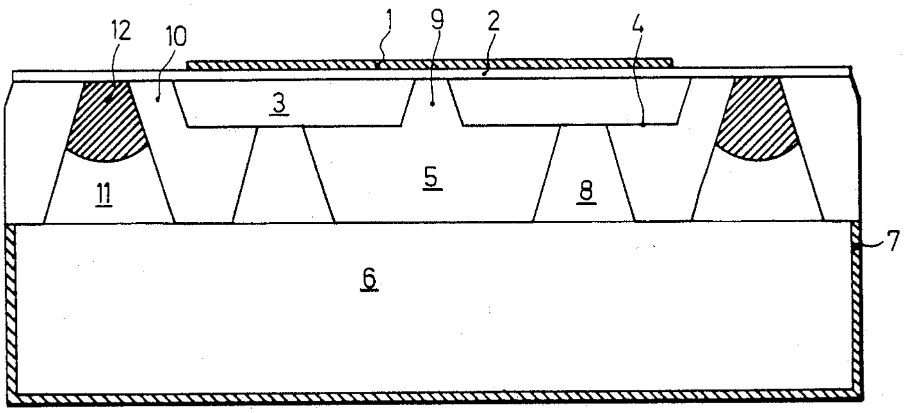
FIG. 2 shows a cross-sectional view, taken on the line II—II of FIG. 1.

FIGS. 1 and 2 show an embodiment of an electroacoustic transducer according to this invention. The subject transducer generally comprises two electrodes forming a capacitor. One of these electrodes, in particular the top electrode, is generally provided on a thin flexible membrane acoustically coupled to the surroundings of the transducer. The other electrode, in particular the bottom electrode, is generally rigid and, in this embodiment, consists of silicon. The spacing between the facing surfaces of these electrodes is very small and thus a narrow air gap is defined between these electrodes. When the flexible membrane is set in vibration, the capacitance formed by the two electrodes is changed. When an electric field is present between the two electrodes, such a change in capacitance will effect a corresponding output signal of the transducer. When, for example, the transducer operates as a microphone, and the membrane is set in vibration by sound waves impressed from the surroundings, the transducer provides an electric output signal. For an output signal to be suitable for use, it is necessary that the electric field present between the electrodes has a certain size. In an electroacoustic transducer of the subject kind, use is made of a fixed electric charge introduced into the transducer and present between the capacitor electrodes. Such an electric charge is carried by an electrically insulating layer, or a layer of dielectric.

Generally speaking, an electroacoustic transducer of the subject kind is composed of a so-called motor portion and a case acoustically coupled with it. The motor portion generally comprises a so-called backplate with an associated bottom electrode, the electret, and the membrane with associated top electrode. In this construction the backplate consists of semiconductor material, in particular monocrystalline silicon with a crystal structure of the kind designated, for example, by (100).

In FIGS. 1 and 2, all this is designated as follows: (1) top electrode; (2) membrane foil; (3) air gap; (4) electret; (5) backplate; (6) air space in (7) case; (8) acoustic openings through which the air gap is in communication with the air space; (9) membrane supporting projection.

As shown by FIG. 1, the embodiment under discussion comprises four acoustic openings, such as 8, and one membrane supporting projection, such as 9. It is conventional for the air gap, such as 3, to be acoustically coupled to an additional air space, such as 6, to reduce acoustic attenuation. For the sake of completeness, it is noted that an opening should be present in the membrane or in the case to provide for pressure equalization between the front and back of the membrane. The electronics associated with the transducer may either be integrated into the silicon backplate, or arranged in the microphone case as a part separate from the backplate. Such electronics are electrically connected to the top and bottom electrodes using existing technology. In the subject transducer, the backplate functions as bottom electrode, as the silicon is also conductive to a certain extent; however, it should be contacted through a conductor.

As shown by FIG. 2, the electret 4 is located on a recessed portion of the backplate, which recessed portion is bounded along its outer circumference by an edge portion 10 which is raised relatively to it. According to one aspect of the present invention, the membrane foil with the top electrode present on it is secured to this peripherally extending edge portion 10, with the membrane foil 2 thus secured being supported by the membrane supporting projection 9. For such a manner of securing, openings such as 11 are formed in the raised edge portion. The membrane is secured to the backplate through adhesive 12, applied in each of these openings.

The electret material used is a material suitable for IC processing, such as $SiO_2$, which as will be explained below has been subjected to a certain surface treatment.

A transducer construction as described hereinbefore offers the possibility of making a relatively large number of transducer units (motor portions) in one pass using cost-effective micromachining technology, specifically known per se photolithographic processes and chemical etching techniques.

One embodiment of a method according to the present invention, whereby, starting from a silicon wafer, and using micromachining technology, a relatively large number, for example, several hundreds, of the above motor portions can be made in a single pass and with a high degree of reproducibility, will now be described, by way of example, with reference to FIGS. 3-11.

Figure 3:
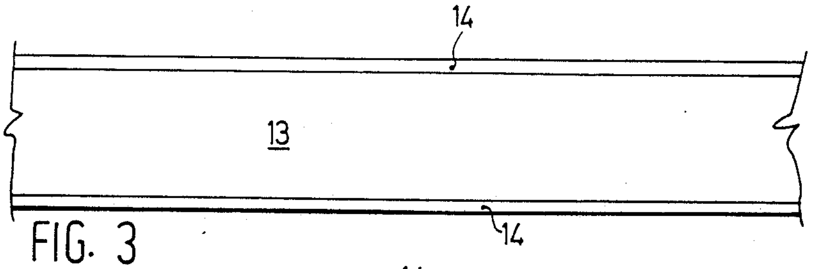
Figure 4:
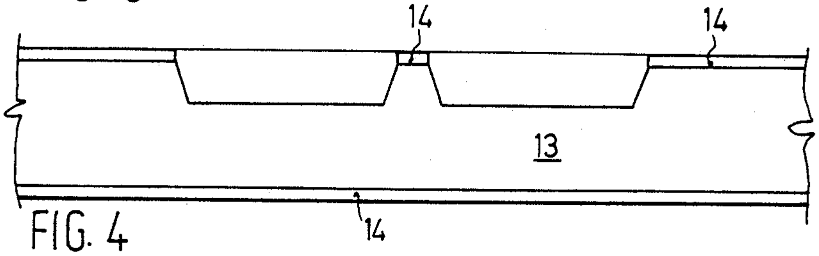
Figure 5:
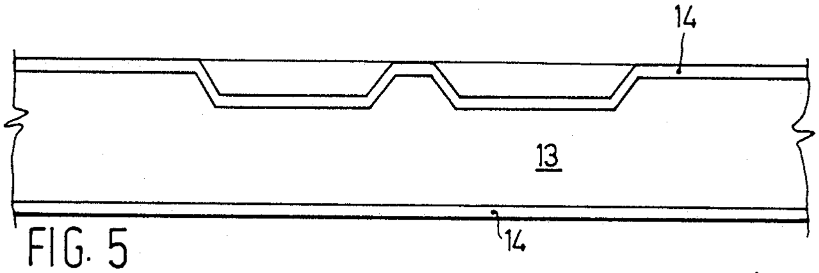
Figure 6:
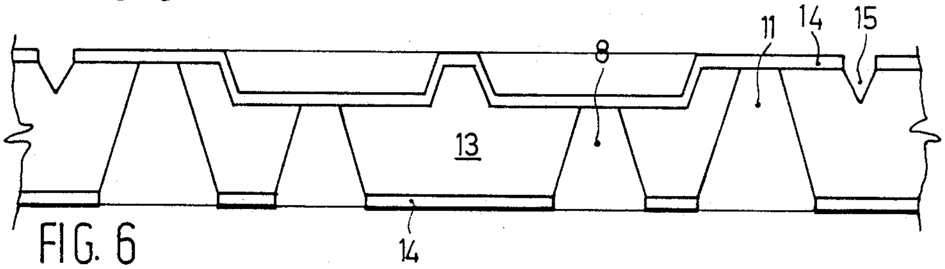

The starting product for such a method is a normal, conventional wafer, specifically a slice of p- or n-silicon with a crystal structure of the type designated, for example, by (100). In FIG. 3, a portion of such a wafer 13 is shown in cross-sectional view, with a layer of masking material 14, generally a layer of $SiO_2$, formed on the two main surfaces thereof by a known per se technique. For the sake of completeness, it is noted that FIGS. 3-11 are not to scale, and only intended as an illustration of the various stages of a manufacturing cycle or pass. Subsequently, and by means of a conventional photolithographic process, a pattern is formed in one layer of this masking material. This pattern is determinative of the peripheral contour of the recessed portions (air cavity) such as 3, and the location of the membrane supporting projections, such as 9, provided thereon, for the number of transducer units (motor portions) to be made from this wafer, which are disposed in a contiguous arrangement of rows and columns. Subsequently the masking material is etched away at the portions defined by the pattern, so that a mask 14 of $SiO_2$ is formed on the silicon substrate 13 on one main face thereof, and through which the portions of the silicon substrate corresponding to the above air cavities can be etched away. Such etching away of silicon to form the above air cavities can be effected, for example, by anisotropic etching, using a known per se anisotropic etching agent, such as an ethylene diamine mixture, or KOH. FIG. 4 illustrates diagrammatically the situation arisen after termination of this anisotropic etching process. It will be clear that FIG. 4 only shows this for a single transducer unit. The crystal structure defines the bevel of the cavity obtained. This anisotropic etching process is continued as desired until an air cavity depth is reached in a range of 0.5–100 micron. When the condition shown in FIG. 4 has been reached, the masking material 14 is etched away. Thereafter the two sides of the wafer are again covered with a layer of masking material 14, for example, by means of a known per se oxidation process. The situation then obtained is shown diagrammatically in FIG. 5. Subsequently a pre-determined pattern is formed in these two layers of masking material by means of a conventional photolithographic process. The pattern on the side of substrate 13 which is to face the air space such as 6 determines the location and size of the acoustic openings such as 8, and the fastening openings, such as 11, to be formed in this substrate. The pattern formed in the other masking layer 14 is essentially a mesh-shaped lattice pattern, each mesh of which corresponds to the peripheral contour of one of the plurality of transducer units to be formed in a contiguous arrangement of rows and columns. When both patterns have thus been formed in the masking material, this masking material is selectively etched away so that the silicon of the substrate 13 thus become accessible can also be etched away. For this purpose, use can also be made of an anisotropic etching process by immersing both sides of the whole in the above anisotropic etching agent. FIG. 6 illustrates diagrammatically the situation obtained after termination of the anisotropic etching process. On the side of the air cavities, the wafer is here provided with a lattice pattern of grooves, such as 15, with a V-shaped cross-sectional configuration. The object of these grooves will be clarified hereinafter. Substrate 13 is also provided with through-holes, i.e., the acoustic openings referred to, such as 8, and the membrane securing openings referred to, such as 11. As a result of the anisotropic etching process, the cross-sectional area of these openings, as viewed in a direction towards the air cavities, gradually decreases. Subsequently, the $SiO_2$ masks 14 should be removed (stripping of the masking material) to open the openings such as 8 and 11. The situation then obtained is shown in FIG. 7 (in which the cross-section shown is representative of a single transducer unit). Subsequently, electret material should be applied to the bottom of the air cavities 3 or the recessed portions. For this purpose, in accordance with a further aspect of the present invention, use is made of a material suitable for IC processing, such as $SiO_2$. The thickness of the layer of $SiO_2$ to be applied preferably has a value in the range of from 0.1 to 3 micron. Such a layer of electret material is formed by a conventional oxidation process. For this purpose, the wafer is bodily subjected to such an oxidation process in a condition as illustrated in FIG. 7. The situation then obtained is shown diagrammatically and not to scale in FIG. 8. The layer of electret material $SiO_2$ applied is designated by 4. For the sake of completeness it is noted in this connection that all outside surfaces of the wafer, including the hole walls, are covered with such a layer of electret material. Thus an optically transparent, imperforate, tear-free $SiO_2$ layer of the desired thickness can be obtained, for example, by thermooxidation of silicon.

As a result of the crystalline character of the boundary face between the silicon of the substrate and the $SiO_2$ formed thereon, the bond is of a high grade quality. Although the surface conductivity at the boundary face between this layer of $SiO_2$ and the ambient air is very low, it is adversely affected by the attraction of water molecules, or water ions, from the ambient air. This brings about such a high degree of conducicivity that an electric surface charge applied will leak away to an inacceptable extent. According to a further aspect of the present invention, it is achieved, by means of a physicochemical modification of the $SiO_2$ surface that water molecules (ions) from the ambient air will not be attracted by the $SiO_2$ boundary face (hydrophobic conversion). As a result of such a surface treatment, it is found that there is no longer any measurable lateral transport of charge. In other words, the surface conductivity has become so low that an electret with $SiO_2$ material is effectively possible. For such an $SiO_2$ surface treatment, as a result of which the surface conductivity is not increased from water adsorption, use is made, for example, of HMDS (hexamethyl disilazane), or related substances. This HMDS can be applied by various known per se methods.

Subsequently, the thus treated $SiO_2$ functioning as an electret dielectric is electrically charged using a known per se technique so as to produce a charge of the desired value. Current methods of making this kind of electrets are electron ray charging (scanning electron microscope—SEM); corona charging or liquid-contact charging.

When the wafer has subsequently being brought into a condition as shown diagrammatically in FIG. 8, the side of the wafer containing the air cavities is then covered with a membrane foil, e.g., Mylar, to produce a situation as shown diagrammatically in FIG. 9. It will be seen that all the transducer units to be formed from this wafer are covered by the same membrane foil. Subsequently, the membrane foil 2 thus applied should be secured to the elevated edge portions, such as 10, of the relevant transducer units. This can be achieved, according to one aspect of the method according to the invention, in a single manufacturing step by providing an adhesive, such as 12, in the attachment openings, such as 11, from the back of the substrate 13, or the side thereof intended to face the air chamber such as 6. FIG. 9 is representative of the situation in which the applied membrane foil 2 is fixedly secured to the elevated edge portions 10 of the substrate 13 by adhesive 12.

FIG. 11 is illustrative of an alternative technique for securing the membrane foil to the substrate. For this purpose, through the attachment openings, such as 11, a layer 16 of a suitable material, such as Cu, is applied by vapour deposition or sputtering, on the interior of the apertures such as 11, and also on the opposing parts of the membrane foil 2 applied to the substrate. It has been found that in this way a firm joint can be formed between the membrane foil and this layer and hence the substrate. The membrane foil can thus be secured, for example, by applying plastic or a metal by vapour deposition or sputtering through the back of the wafer, or an adhesive spray. During this treatment the acoustic openings, such as 8, are covered by a shadow mask. Subsequently, the top electrodes, such as 1, are provided by means of a shadow mask. This can be realized, for example, by vapour deposition of aluminum after the shadow mask has been applied to the top of the membrane foil. In this way, a situation as shown diagrammatically in FIG. 10 is created for each of the transducer units to be formed from the wafer. In this connection it is noted, for the sake of completeness, that the method described above offers the possibility of applying the membrane foil and securing it to the substrate substantially free from mechanical stresses. Preferably, the adhesive is applied in the attachment holes by a process which does not lead to any appreciable rise in temperature of the membrane foil. If desired, the membrane may alternatively be applied and secured with a certain pre-stress.

When the membrane foil and the top electrodes secured thereto have been secured to the pre-treated and electrically charged wafer, to provide the situation illustrated in FIG. 10, this membrane foil is cut through in accordance with the lattice pattern of V-shaped grooves 15 formed in the wafer. Thereafter the wafer can be disintegrated by breaking it, also in accordance with the lattice pattern of V-shaped grooves, to produce a plurality of individual transducer units (motor portions) from the wafer. In FIG. 10, these lines of fracture are indicated by broken lines.

The transducer unit thus produced can then be mounted. Each transducer unit is secured in a case; the transducer electrodes are electrically connected to the pertinent electronic circuitry; an electric terminal for the top electrode is secured to the case, for example, by using a conductive adhesive; a terminal for the bottom electrode, or the backplate, is secured to the backplate, also by means, for example, of a conductive adhesive; and, if necessary, the integrated electronics are contacted.

Naturally, the invention is not limited to the embodiment described hereinbefore. Shape and dimensions, and also the number of the attachement openings and the acoustic openings can be varied as desired. This also supplies to the number and location of the membrane supporting projections, such as 9. In this connection it is noted that, if desired, such supporting projections can be done without. The relatively small membrane supporting surface of the projections, such as 9, which is a result of the anisotropic etching of substrate material in forming the air cavities, has a favourable effect on the sensitivity and the efficiency of the transducer ultimately produced.

The data specified below only serve to illustrate the invention, and are not intended to limit it in any way.

Starting from a wafer having a diameter of about 10 cm, the method according to this invention makes it possible to manufacture therefrom $16\times16=256$ transducer units. The circumferential dimensions of such a transducer unit are, for example, $3\times3$ mm. The depth of the air cavities, such as 3, generally ranges from about 15 to 35 micron, and it may be expected that a depth of 10 micron may be meaningful. The usual thickness of a starting wafer is about 0.3 mm. A usual thickness of the electret layer ($SiO_2$) is about 1 micron. The bevel of the substrate material caused by the anisotropic etching process is about 54° relative to a substrate main face.

The attachment openings, such as 11, are, for example, 300 and 600 micron long and 70 micron wide; the acoustic openings are, for example, 200 micron wide and 200 micron long. These dimensions are valid for the side of the substrate facing the membrane foil.

Figure 12:
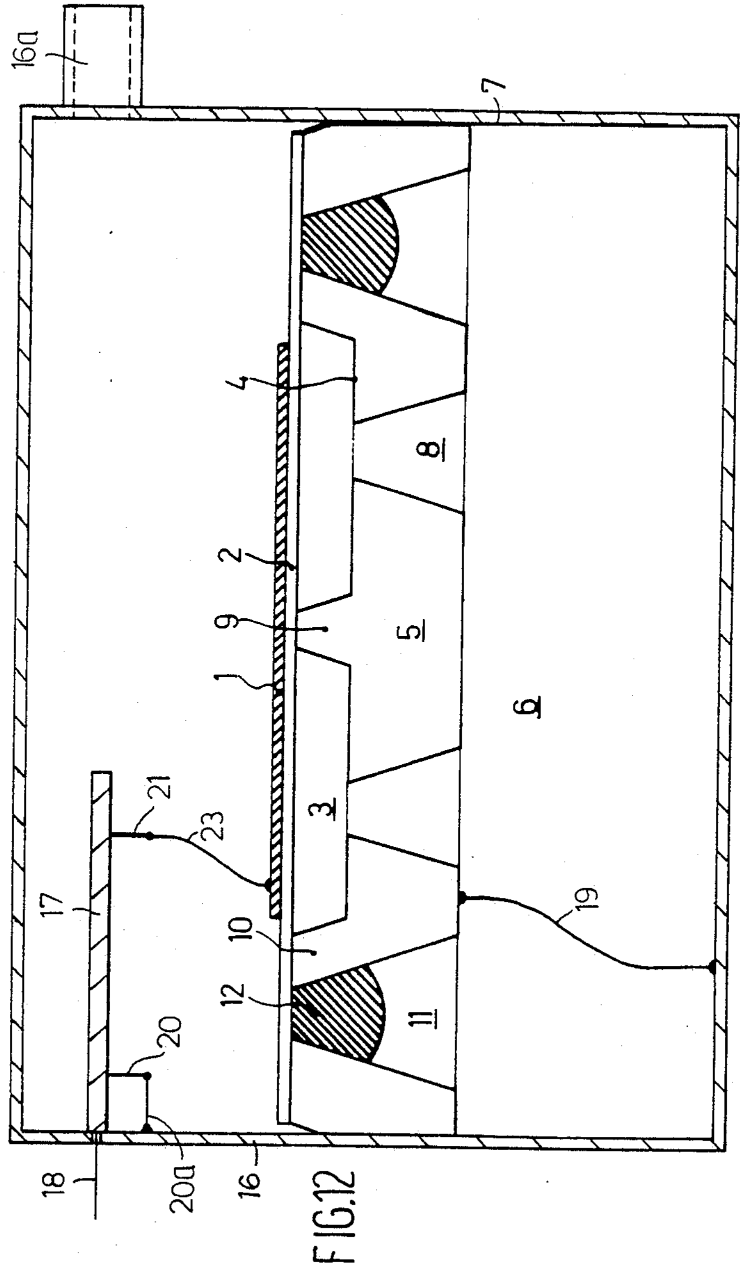
FIG. 12 is a cross-sectional side view of an electroacoustic transducer according to this invention, mounted in a case.

FIG. 12 diagrammatically shows, in a side-elevational view, in what way the electroacoustic transducer according to the invention can be advantageously placed in a metal case 16 in such a manner as to ensure that the parallel capacitance between the electrode connected to the signal input of the hybrid electronic amplifier, also mounted in the case, provides a minimum parasitic capacitance parallel to the capacitance of the transducer.

In FIG. 12, like parts are designated by the same reference numeral as in the other figures. The transducer shown in particular in FIG. 2 is placed in a metal case with an air inlet opening 16a so that variations in the air pressure may be monitored by means of the membrane. The air inlet opening 16a may be at the membrane side of the transducer, as shown in the figure, but alternatively is positioned on the side of the backplate 5. As the transducer is, as it were, transparent to air pressure variations, the position of the inlet opening 16a has hardly any effect on the behaviour of the transducer. Also mounted in case 16 is a known per se hybrid electronic amplifier 17 with a plurality of supply and signal leads 18, passed to the outside, only one of which is shown. The amplifier has a terminal 20 with a common potential and a signal terminal 21. Terminal 20 is connected in known manner to case 16 via a line 20a. According to the invention, the substrate or the backplate 5 is also connected via a line 19 to the case 16 and hence with the common potential, while the electrode 1 provided on membrane 2 is connected to a line 23 to the signal input 21 of amplifier 17. This manner of connection has the advantage that the parasitic parallel capacitance formed by the electrode 1 connected to the membrane and the adjacent wall of case 16 is minimal. According to a preferred embodiment of the present invention, the surface of this electrode is located within the confines of the peripheral edge of the recessed portion. This means that the electrode secured to the membrane is spaced a certain distance from the wall, which results in a lower parallel capacitance.

We claim:

1. A method of making an electroacoustic transducer characterized by the steps of

- forming a mask on one main face of a wafer of monocrystalline silicon, said mask having a pattern defining the peripheral contour of the recessed portion and the place of any membrane supporting projections thereon of a plurality of transducer units contiguous with one another in rows and columns;
- etching the silicon accessible through said mask away to a pre-determined depth, using an etching agent, to form the recessed portion of said transducer units;
- forming on the peripheral edges, which are raised relatively to the recessed portions, a mask whose pattern defines the outer circumferential contour of each of the transducer units contiguous with one another in rows and columns, and forming on the other main face of the wafer a mask whose pattern defines all the openings extending through the substrate of the transducer units to be made from the wafer;
- etching the silicon accessible through said two masks away by using an etching agent, so that, on the one hand, a mesh-like lattice pattern of V-shaped grooves is recessed in the raised peripheral edges, and on the other, openings extending through the substrate are formed, said openings being covered by masking material on the side where said mesh-like lattice pattern is provided;
- removing the masking material;
- covering the assembly thus obtained with a layer of dielectric, in particular a layer of $SiO_2$;
- charging said layer of dielectric uniformly with electric charge;
- covering the assembly on the side where said mesh-like lattice pattern is provided with a membrane foil;
- covering the openings extending through the wafer, except those extending through said edge portions;

filling the exposed openings from the side away from that where the membrane foil is provided with an adhesive so as to secure the membrane foil to the substrate through said adhesive;

providing on the membrane foil electrodes and contacts for contacting with electronics for the transducer units by means of a shadow mask;

cutting the membrane foil according to the mesh-like lattice pattern of V-shaped grooves; and disintegrating the wafer according to said pattern of V-shaped grooves to form a plurality of separate transducer units.

2. A method of making an electroacoustic transducer characterized by the steps of forming a mask on one main face of a wafer of monocrystalline silicon, said mask having a pattern defining the peripheral contour of the recessed portion and the place of any membrane supporting projections thereon of a plurality of transducer units contiguous with one another in rows and columns;

etching the silicon accessible through said mask away to a pre-determined depth, using an etching agent, to form the recessed portion of said transducer units;

forming on the peripheral edges, which are raised relatively to the recessed portion, a mask whose pattern defines the outer circumferential contour of each of the plurality of transducer units contiguous with one another in rows and columns, and forming on the other main face of the wafer a mask whose pattern defines all the openings extending through the substrate of the transducer units to be made from the wafer;

etching the silicon accessible through said two masks away by using an etching agent, so that, on the one hand, a mesh-like lattice pattern of V-shaped grooves is recessed in the raised peripheral edges, and on the other, openings extending through the substrate are formed, said openings being covered by masking material on the side where said mesh-like lattice pattern is provided;

removing the masking material;

covering the assembly thus obtained with a layer of dielectric, in particular a layer of $SiO_2$;

via the exposed openings, and from the side on which the membrane foil is provided, evaporating or sputtering a material on to the interior of said openings and on the opposed portions of the membrane foil, so as to secure the membrane foil through said material to the substrate;

providing on the membrane foil electrodes and contacts for contacting with electronics for the transducer units by means of a shadow mask;

cutting the membrane foil according to the mesh-like pattern of V-shaped grooves; and disintegrating the wafer according to said pattern of V-shaped grooves to form a plurality of separate transducer units.

3. A method as claimed in claim 1 or 2, characterized in that the silicon accessible through the mask first mentioned is etched away anisotropically to a certain depth by using an anisotropic etching agent to form the recessed portion of said transducer units.

4. A method as claimed in claim 3, characterized in that the silicon accessible through said two masks is etched away by using an anisotropic etching agent, so that said openings extending through the substrate have cross-sectional areas gradually decreasing in a direction towards the substrate face in which said V-shaped grooves are formed.

5. A method as claimed in claim 1 or 2, characterized in that, immediately before the step of charging the applied layer of dielectric with an electric charge, the outer surface of said layer of dielectric is treated so that said surface has hydrophobic properties.

6. A method as claimed in claim 5, characterized in that said layer of dielectric is treated, before being electrically charged, with HMDS (hexamethyl disilazane).

* * * * *